US005995621A

United States Patent [19]

Bryant et al.

[11] Patent Number: 5,995,621
[45] Date of Patent: Nov. 30, 1999

[54] USER INSTALLED TELEPHONE OPTION MODULE

[75] Inventors: David Bryant; Pierce Jones, both of Austin; Wayne McKinnon, Georgetown; William McRight, Round Rock, all of Tex.

[73] Assignee: Siemens Information and Communication Networks, Inc., Boca Raton, Fla.

[21] Appl. No.: 08/422,685

[22] Filed: Apr. 13, 1995

Related U.S. Application Data

[63] Continuation of application No. 08/401,651, Mar. 10, 1995, abandoned, which is a continuation of application No. 08/220,121, Mar. 30, 1994, abandoned, which is a continuation of application No. 07/903,582, Jun. 25, 1992, abandoned.

[51] Int. Cl.[6] ...................................................... H04M 1/00
[52] U.S. Cl. ............................................................ 379/428
[58] Field of Search .................................. 379/428, 429, 379/435, 436, 357, 144

[56] References Cited

U.S. PATENT DOCUMENTS

| | | | |
|---|---|---|---|
| 4,375,584 | 3/1983 | Muzumdar et al. | 379/428 |
| 4,790,007 | 12/1988 | Richter et al. | 379/435 |
| 4,817,127 | 3/1989 | Chamberlin et al. | 379/436 |
| 5,185,791 | 2/1993 | Itoyama et al. | 379/436 |
| 5,237,605 | 8/1993 | Peak et al. | 379/436 |

FOREIGN PATENT DOCUMENTS

| | | | |
|---|---|---|---|
| 276403 | 5/1986 | European Pat. Off. | 379/144 |
| WO90/04896 | 5/1990 | WIPO | 379/428 |

Primary Examiner—Jack Chiang

[57] ABSTRACT

The present invention provides a user installable option module which contains upgrade circuitry to add additional functions to a basic telephone. This generic upgrade module is capable of containing different sets of electronic circuitry which perform different functions and have different applications. The option module is user installable, and requires neither shipping the original unit to repair or upgrade, nor does it require trained service personnel to visit the customer site to perform the installation. The user installed option is installed in the base of a basic telephone. After installation, the option module appears to be an integral part of the basic telephone and is not readily visible to the user. The basic telephone also retains its original footprint. The option module is secured to the basic telephone in such a manner that prevents the option module from being damaged when subjected to significant forces.

12 Claims, 5 Drawing Sheets

USER INSTALLED TELEPHONE OPTION MODULE

CROSS-REFERENCE TO RELATED APPLICATION

This is a continuation of Ser. No. 08/401,651 filed Mar. 10, 1995, now abandoned, which is a continuation of Ser. No. 08/220,121 filed on Mar. 30, 1994, now abandoned, which is a continuation of Ser. No. 07/903,582 filed on Jun. 25, 1992, now abandoned.

BACKGROUND OF THE INVENTION

1. Technical Field

This invention relates generally to telephones, and, more particularly, optional upgrade circuitry for telephones.

2. Related Art

Conventional telephone model lines typically include a basic telephone which contains the most basic and common features desired and used by the telephone user. In addition to these basic functions, a desk unit may perform additional functions which the customer may need or desire. Examples of such additional functions include adding a speaker, encryption or decryption of the voice message, adding a headset to the telephone, or interfacing the basic telephone to a recording device.

One conventional technique used to add these additional upgrades to a basic telephone has been to replace the basic telephone model with another model having the desired functional configuration. A disadvantage of this technique is that it requires maintaining multiple lines of telephones, each comprising one or more different upgrade functions. Another disadvantage is that this technique requires additional trained service personnel to install the new models at the customer site.

Another conventional technique for providing additional upgrade functions to a basic telephone has been to manufacture the basic telephone model with connectors on one or both of its sides. These connectors interface to a separate module which contains the desired upgrade function. This technique increases the size of the footprint of the phone and makes the basic telephone cosmetically unappealing for those who do not receive such upgrades. In addition, such option modules are sensitive to lateral forces which, if applied while the phone is attached to the basic telephone, can stress or break internal components in either the upgrade module or the basic telephone.

Another conventional technique has been to attach a piece of sheet metal to the bottom of the basic telephone and then attach the option module to this same piece of sheet metal. Electrical connections are then achieved by a cable assembly. The drawback to this technique is the high part and assembly cost due to the large number of additional parts, the bottom surface of the telephone must be dedicated to the attachment of this option module, and the weight of the entire telephone is significantly increased, leading to component failures if the phone is dropped.

What is needed is a telephone option module with upgradable circuitry which can be installed in a basic telephone. The option module needs to be installed in such a manner as to minimize the increase in the footprint of the basic telephone. In addition, the option module needs to be secured to the telephone in such a manner that prevents the option module and basic telephone from being damaged when subjected to significant forces. The option module also must not produce cosmetic difficulties in the basic telephone. There should not be, for example, visible wires connecting the option module and the basic telephone after it is installed, nor should the basic telephone have connectors visible to the user when no option module is installed.

SUMMARY OF THE INVENTION

The present invention provides a user installable option module which contains upgrade circuitry to add additional functions to a basic telephone. This generic upgrade module is capable of containing different sets of electronic circuitry which perform different functions and have different applications. The option module is user installable, and requires neither shipping the original unit to repair or upgrade, nor does it require trained service personnel to visit the customer site to perform the installation.

The user installed option is installed in the base of a basic telephone. After installation, the option module appears to be an integral part of the basic telephone and is not readily visible to the user. The basic telephone also retains its original footprint. The option module is secured to the basic telephone in such a manner that prevents the option module from being damaged when subjected to significant forces.

BRIEF DESCRIPTION OF THE DRAWINGS

The foregoing and other features and examples of the invention will be apparent from the following more particular description of preferred embodiments of the invention as illustrated in the accompanying drawings in which.

DETAILED DESCRIPTION OF THE INVENTION

The preferred embodiment of the present invention is now described with reference to the Figures where like reference numbers refer to like elements.

Figure 1:
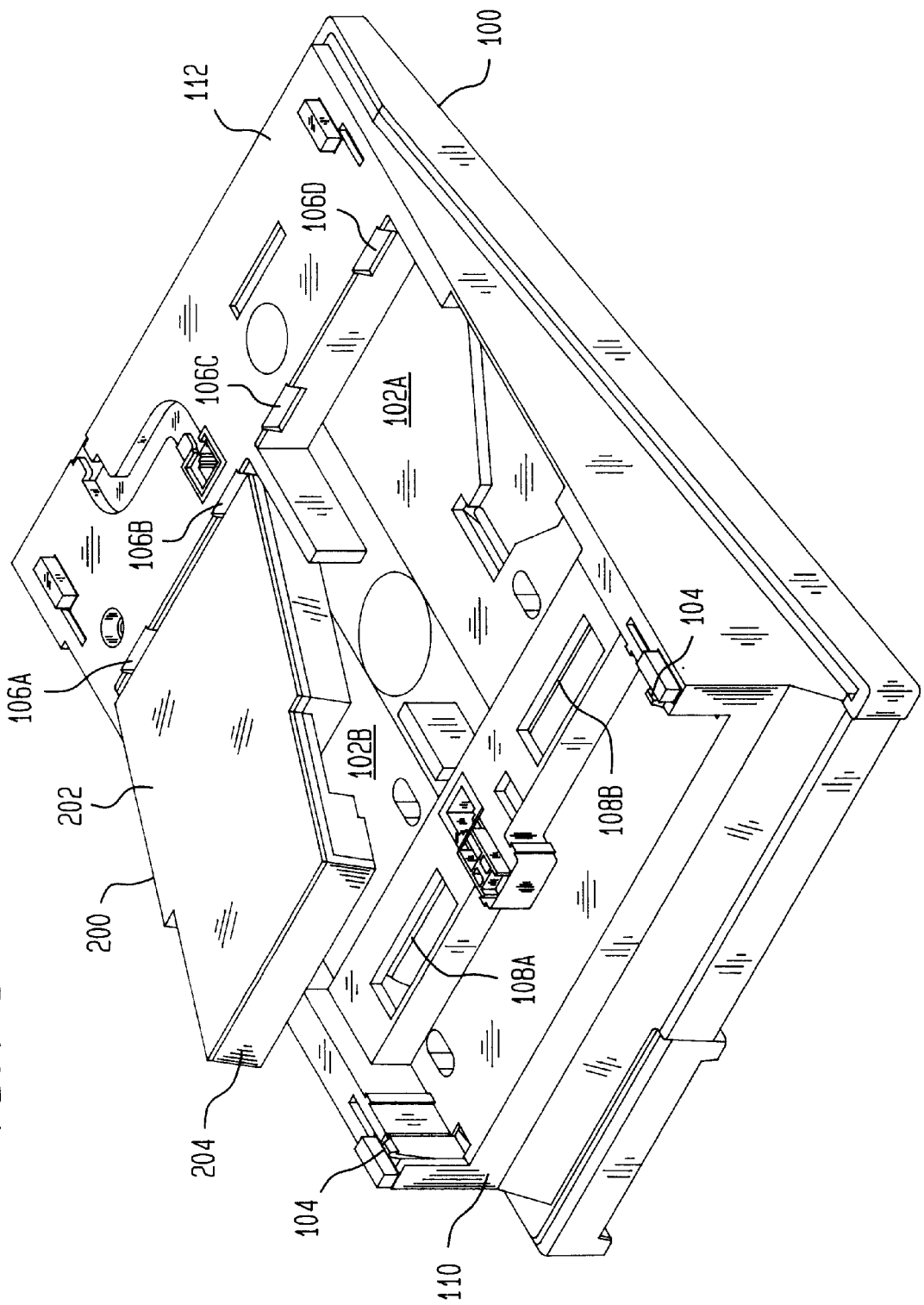
FIG. 1 is a bottom perspective view of a basic telephone with an option module partially installed.

Referring to FIG. 1, a bottom perspective view of a basic telephone 100 is illustrated. Basic telephone 100 contains two option bays 102A and 102B (collectively or generally referred as 102 in the text), which are symmetrical to each other. Each option bay 102 is functionally identical and can accept an option module 200. Associated with each option bay 102 are three points of contact for securing the option module 200 to the basic telephone 100. The first two are slots 106A and 106B or 106C and 106D (collectively or generally referred as 106 in the text), which will accept a tab insert from the option module 200. The third is a snapping arm 104 which secures the option module 200 on a side opposite slots 106. Connector slots 108A and 108B, (collectively or generally referred as 108 in the text), are used by option module 200 to communicate with basic telephone 100. There is one connector slot 108 associated with each option bay 102. Basic telephone 100 has a card edge (not shown) which is accessible by option module 200 through connector slot 108.

Figure 2:
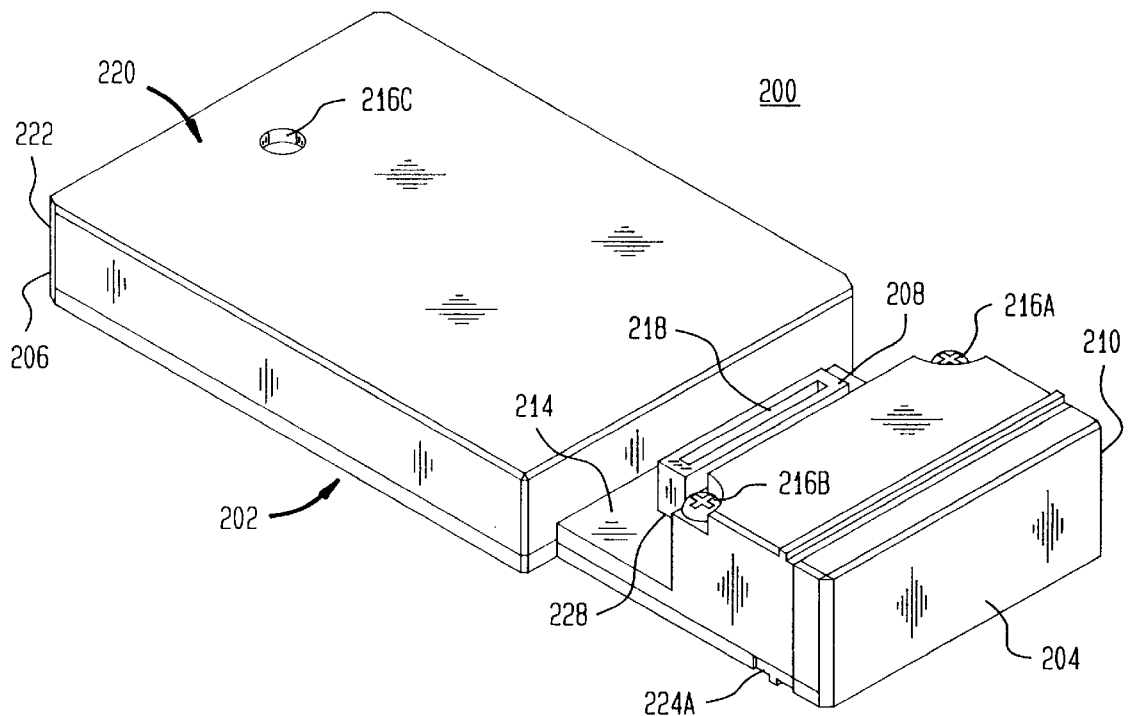
FIG. 2 is a front perspective view of a generic option module.
Figure 3:
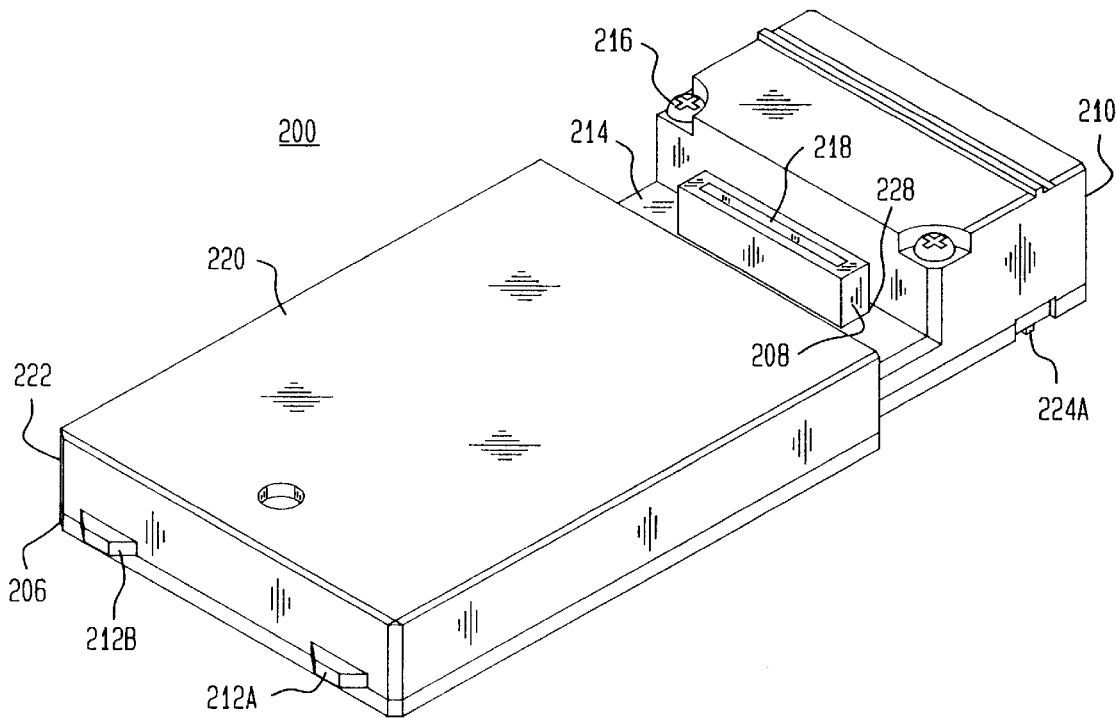
FIG. 3 is a rear perspective view of a generic option module.

Referring to FIGS. 2 and 3, option module 200 consists of a housing top 222, housing bottom 206, and an endcap 210. Card edge connector 208 extends through an aperture 228 in a recessed area 214 on the housing top 222. Extending card edge connector 208 through an aperture 228 and positioning it in a recessed area 214 results in the card edge connector 208 being protected by the housing body of the option module 200. This prevents the card edge connector 208 from being damaged from twisting or bending. Card edge connector 208 has an opening 218 for receiving the card edge which is part of the printed wiring assembly of basic telephone 100. Card edge connectors 208 such as the one used here in the preferred embodiment are well known in the art.

Pivot tabs 212A and 212B (collectively or generally referred as 212 in the text), are part of housing top 222 and are used to secure the option module 200 to the basic telephone 100 when option module 200 is installed in option bay 102. Option module 200 also has two latching edges 224A and 224B (collectively or generally referred as 224 in the text), one on each side of option module 200. Only latching edge 224A is visible in FIGS. 2 and 3. Latching edge 224B is visible in FIG. 4. These two latching edges 224 assist in securing option module 200 to the basic telephone 100. When installed in option bay 102, latching edges 224 secure option module 200 to the basic telephone 100. In the preferred embodiment of the present invention, pivot tabs 212 and latching edges 224 have been used to secure the option module 200 to the basic telephone 100. However, it should be known that other means of securing the option module 200 and option bay 102 are available.

Installation of option module 200 into basic telephone 100 is achieved without tools of any kind by turning the basic telephone 100 upside down and snapping the option module 200 into position. Pivot tabs 212 on option module 200 fit into slots 106 on the underside of basic telephone 100 and act as pivot points to guide the installation of option module 200 into either option bay 102. Option module 200 is rotated into position, connecting the card edge connector 208 with the card edge on the printed wiring assembly within the basic telephone 100. As the user pushes the option module 200 into place, snapping arm 104 actuates to secure it. The snapping arm 104 is located along the length of option module 200 housing as far away from the pivot tabs 212 as possible. Option module 200 has two latching edges 224 onto which snapping arm 104 can attach. Which latching edge 224 the snapping arm 104 attaches to depends on which option bay 102 option module 200 is installed in. The housing body of option module 200 has a top surface 220 and a bottom surface 202. When option module 200 is inserted into option bay 102, the top surface 220 of option module 200 is placed face down into option bay 102. When completely installed, the bottom surface 202 of option module 200 is substantially flush with the bottom surface 202 of the basic telephone 100. In addition, the endcap surface 204 of endcap 210 is substantially flush with the rear surface 110 of basic telephone 100.

This firm attachment, coupled with the interlocking recessed position of option module 200 in option bay 102, insures that the option module 200 will not be disengaged due to the pulling of external connections, shock, or vibration. For all practical purposes, the option module 200 has become a part of the basic telephone 100. Option module 200, however, can easily be removed by disengaging the snapping arm 104. Once installed, option module 200 appears to be an integral part of the basic telephone 100 and is not readily visible to the user. The basic telephone 100 retains its original footprint.

In the preferred embodiment of the present invention, basic telephone 100 is a ROLM 60000 series telephone. However, one should know that any basic telephone 100 which can receive, identify, and interface with option module 200 can be used.

Figure 4:
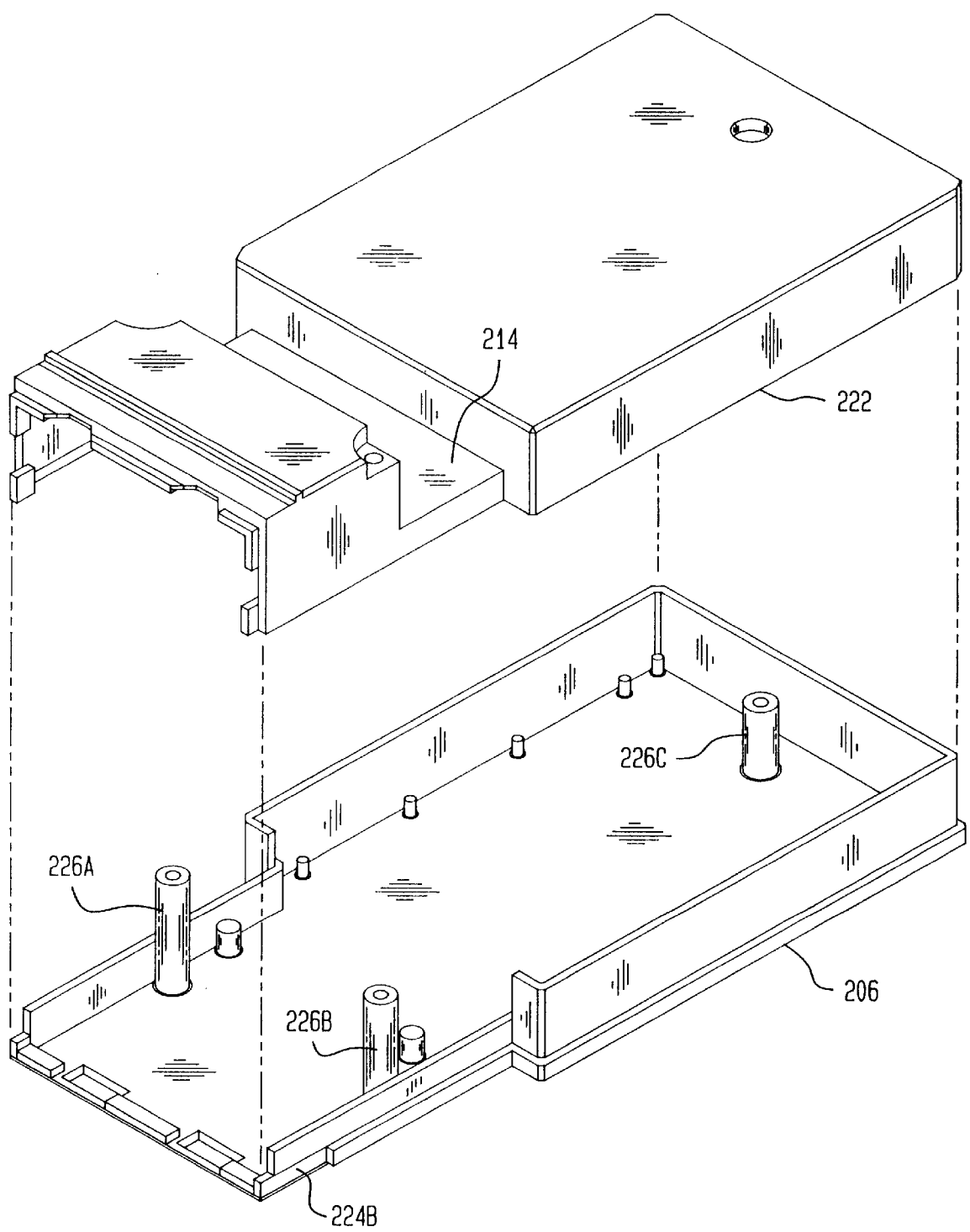
FIG. 4 is an exploded view of the option module housing body.

Referring to FIG. 4, an exploded view of option module 200 housing is illustrated. Housing bottom 206 has support posts 226 to support the housing top 222 when the housing body is assembled. As illustrated in FIG. 2, the housing top 222 is secured to the housing bottom 206 by screws 216A, 216B, and 216C (collectively or generally referred as 216 in the text), which are attached to support posts 226. Housing top 222 and housing bottom 206 of option module 200 always have the same configuration to fit into option bay 102 of basic telephone 100. Housed within housing top 222 and housing bottom 206 is a printed wiring board 400 containing upgrade circuitry to perform a specific function which is not performed by the basic telephone 100. The housing top 222 and housing bottom 206 are interchangeable with the different versions of upgrade circuitry. However, endcap 210 will change with each type of upgrade circuitry to support the external connections necessary.

Figure 5:
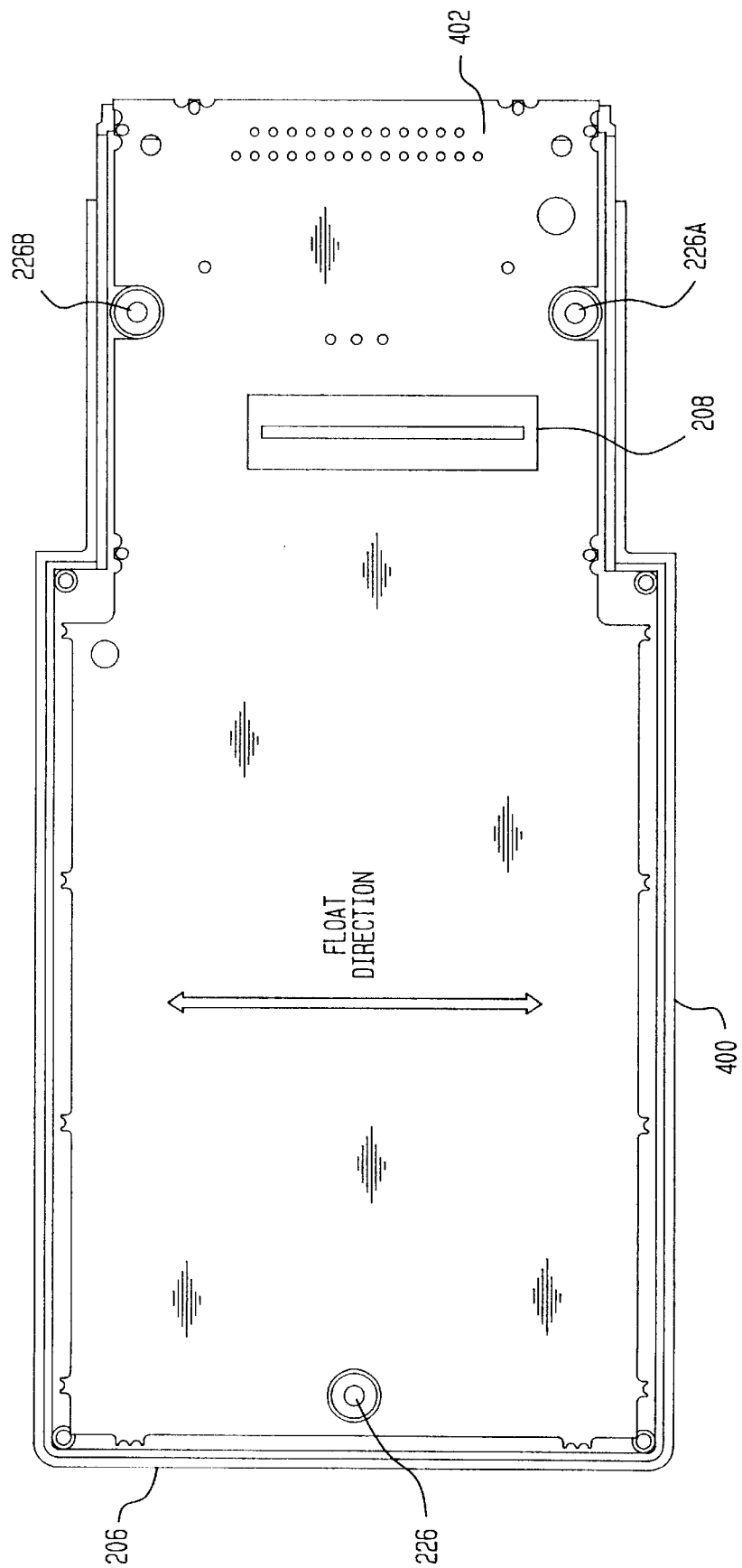
FIG. 5 is a top view of a generic printed wiring board installed in an option module.

Referring to FIG. 5, printed wiring board 400 positioned in housing body 206 is illustrated. All models of printed wiring board 400 contains upgrade circuitry to perform a specific function, card edge connector 208, and connector edge 402. Printed wiring board 400 is shaped such that support posts 226 extending from the housing bottom 206 can extend past the printed wiring board 400 to support the housing top 222. All models of printed wiring board 400 used in option module 200 have a common outline to conform to the housing bottom 206. Printed wiring board 400 is smaller than the recessed area 214 within housing bottom 206 to enable the printed wiring board 400 to float in the direction of the arrows shown in FIG. 5. This insures that the card edge connector 208 and the card edge within the basic telephone 100 will align properly during installation.

Many types of upgrade circuitry which are contained in option module 200 require the option module 200 to interface with external devices other than basic telephone 100. For such upgrades, external connectors are mechanically and electrically connected to the printed wiring board 400 at the location of connector edge 402. For example, referring to FIG. 6, printed wiring assembly 500 contains upgrade circuitry which enables the basic telephone 100 to communicate with a personal computer (PC). Secured on printed wiring board 502 is card edge connector 208 for interfacing with basic telephone 100. Connector edge 402 has a 25-pin RS-232 connector 506 secured to it in order to interface with the PC. Endcap 206 is replaced with endcap 504 to enable cable access to the connector 506. In addition to interfacing with a PC, a basic telephone 100 which has a PC interface option module 200 may also interface with any other electronic device having an RS-232 compatible port and the associated interfacing capability.

Figure 7:
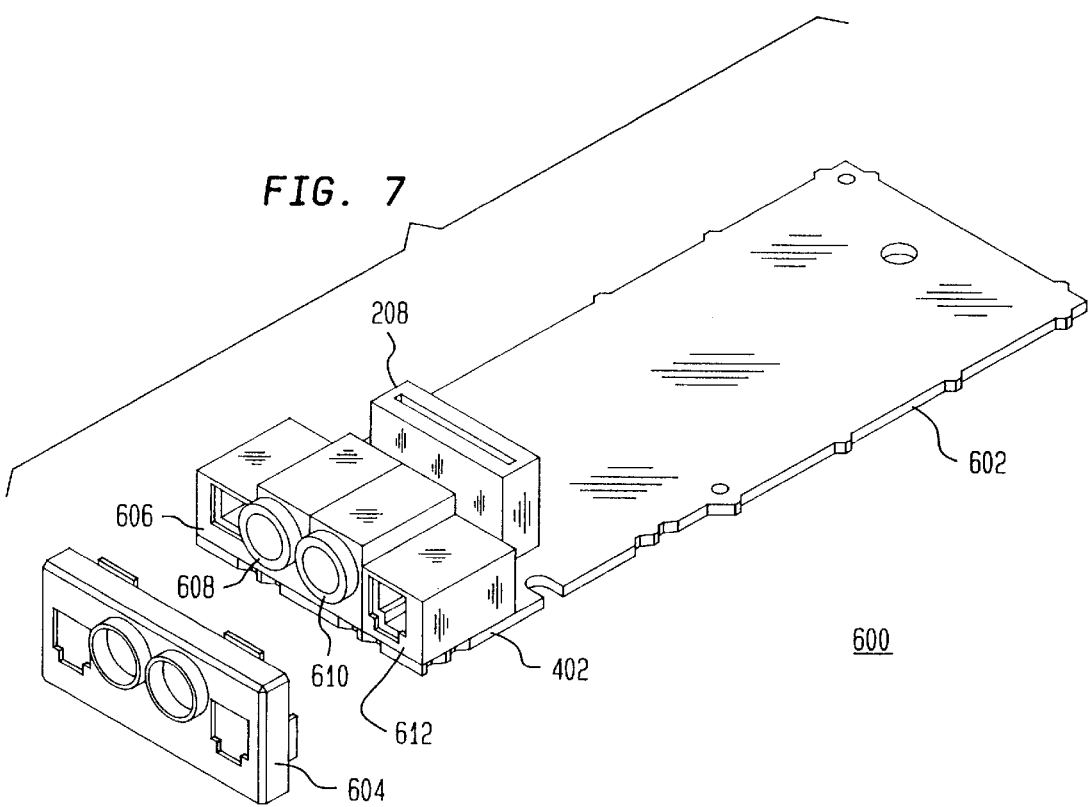
FIG. 7 is a printed wiring assembly for a headset/recorder option module.

Referring to FIG. 7, printed wiring assembly 600 contains upgrade circuitry which enables the user to record telephone conversations and allow the use of headsets. Secured on printed wiring board 602 is card edge connector 208 for interfacing with the basic telephone 100. Connector edge 402 has an interface containing four connectors secured to it:

connector 606 is an RJ-11 connector which provides a recording interface, connector 612 is an RJ-11 connector for a headset interface, and 608 and 610 are a single, 2 prong headset connection. In the preferred embodiment of the present invention, the 2 prong headset connector 608, 610 is manufactured by Switchcraft, Chicago, Ill., U.S.A. However, one should know that other types of 2 prong headset connectors and manufactures may be used. Endcap 604 replaces endcap 206 to allow access to these four connectors.

Figure 6:
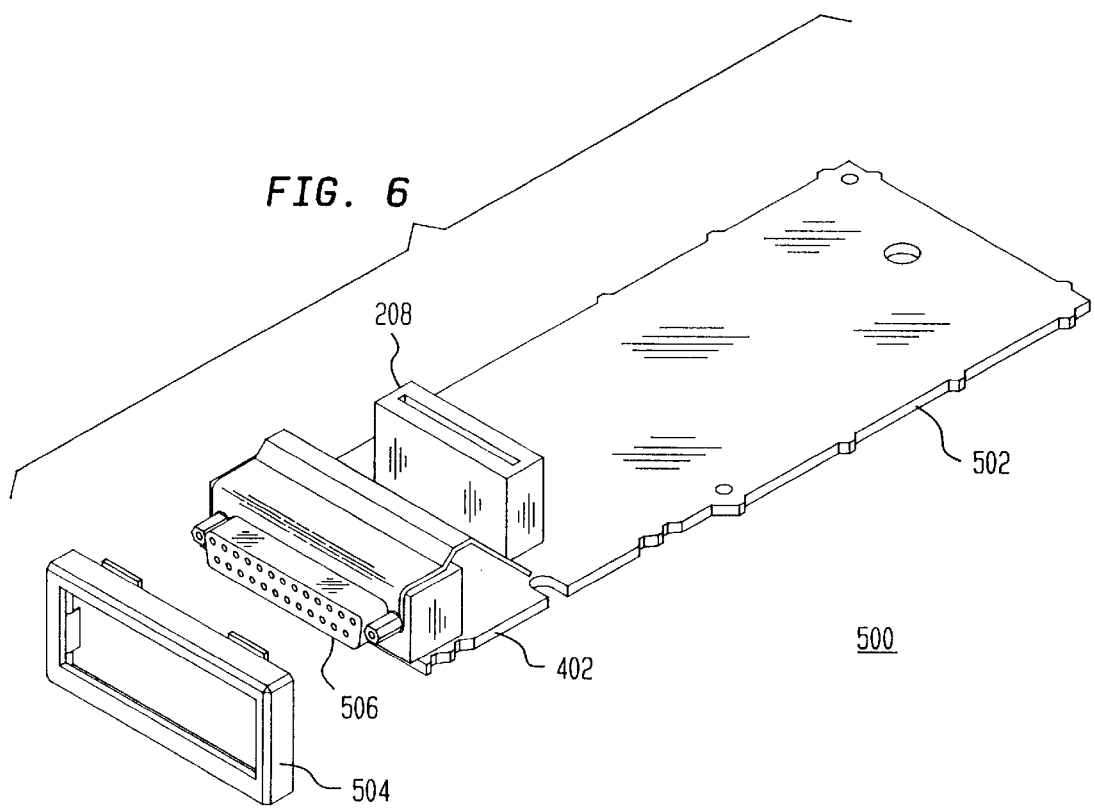
FIG. 6 is a printed wiring assembly for a PC interface option module.

This scheme eliminates the need for any cabling between the basic telephone 100 and the option module 200. As is illustrated in FIGS. 5 and 6, any connectors or switches vital to the functionality of the upgrade circuitry within option module 200 are placed along the connector edge 402 of the printed wiring board 400. An endcap corresponding to the option connector configuration is provided for each unique option type. The option housing or the option module 200 thus provides connections not only to an existing basic telephone 100, but also to an external device or user.

While the invention has been particularly shown and described with reference to a preferred embodiment thereof, it will be understood by those skilled in the art that various changes in form and details may be made therein without departing from the spirit and scope of the invention.

What is claimed is:

1. An upgrade circuitry option module for a basic telephone having a base with an outer surface, a plurality of option bays on the base, each option bay having a connector slot within it, at least one option connector accessible through the connector slot, and a rear surface comprising a portion of the outer surface, the option module comprising:

a housing body having a bottom surface and a top surface and a first aperture disposed though said top surface, said housing body being configured to fit within and conform to the option bay such that said bottom surface of said housing body can be positioned substantially flush with the outer surface of the basic telephone;

an endcap connected to said housing body and configured to be flush with the rear surface of the basic telephone when the option module is installed within the option bay of the basic telephone; and a printed wiring assembly having at least one connector element disposed thereon capable of passing into the connector slot and engaging the option connector when the option module is installed in the option bay of the basic telephone, said printed wiring assembly being enclosed within said housing body wherein said printed wiring assembly has at least one degree of translational freedom of motion within said housing body that enables said at least one connector element to move in relation to said housing body when the option module is installed in the option bay of the basic telephone and said at least one connector engages said the option connector.

2. The system of claim 1, wherein said printed wiring assembly includes at least one second connector that extends through said endcap, whereby said at least one second connector is configured to interface said printed wiring assembly with at least one external device.

3. The system of claim 1, further comprising a coupling means for securely coupling said option module to the basic telephone when said option module is installed in the option bay of the basic telephone.

4. The system of claim 1, wherein said housing body further comprises:

a top housing member, having the top surface as part thereof, wherein a recessed area is disposed on the top surface, thereby defining a recessed surface disposed below said top surface, and wherein said recessed surface defines the aperture through which said at least one connector element extends, and a bottom housing member having a plurality of support posts, configured to support said housing top.

5. The system of claim 3, wherein said coupling means comprises:

a plurality of pivot tabs connected to a first side of said housing body, and configured to align and secure said first side of said housing body while said option module is installed into the option bay of the basic telephone; and a latching edge connected to said housing body on a second side opposite to said pivot tabs and configured to accept a snapping arm, said snapping arm securing said second side to the basic phone when the option module is installed in the option bay.

6. An upgrade circuitry option module for a basic telephone having a base with an outer surface, a plurality of option bays on the base, each option bay having a connector slot within it, at least one option connector accessible through the connector slot, and a rear surface comprising a portion of the outer surface, the option module comprising:

a housing body having a bottom surface and a top surface and configured to fit within and conform to the option bay of the basic telephone such that said bottom surface of said housing body can be positioned substantially flush with the outer surface of the base of the basic telephone;

an endcap connected to said housing body and configured to be flush with the rear surface of the basic telephone when the option module is installed within the option bay;

a printed wiring assembly enclosed in said housing body and having at least one degree of translational freedom of motion therein that enables said printed wiring assembly to move with respect to said housing body;

a first connector connected to said printed wiring assembly, said first connector engaging the option connector in the option bay to form an electrical connection between said printed wiring assembly and the basic telephone when the option module is installed in the option bay of the basic telephone; and a second connector connected to said printed wiring assembly having at least one external port configured to interface the option module with at least one external device.

7. An upgrade circuitry option module for a basic telephone having a base with an outer surface, a plurality of option bays on the base, each option bay having a connector slot within it, at least one option connector accessible through the connector slot, and a rear surface comprising a portion of the outer surface, the option module comprising:

a housing body having a bottom surface and a top surface for housing the components of said option module and for configuring said option module to fit within and conform to the option bay of the basic telephone such that said bottom surface of said option module can be positioned substantially flush with the outer surface of the base of the basic telephone;

an endcap connected to said housing body and configured to be flush with the rear surface of the basic telephone when the option module is installed within the option bay of the basic telephone;

a printed wiring assembly enclosed in said housing body and having at least one degree of translational freedom of motion therein that enables said printed wiring assembly to move with respect to said housing body; and electrical coupling means for electrically coupling the option module with the basic telephone when the option module is installed in the option bay of the basic telephone.

8. The system of claim 7, further comprising a mechanical coupling means for securely coupling said option module to the basic telephone when said option module is installed in the option bay of the basic telephone.

9. The system of claim 8, further comprising a port electrically connected to said electrical coupling means for externally interfacing said option module with at least one external device.

10. The system of claim 9, wherein said housing means further comprises:

a top housing member, having the top surface as part thereof, wherein a recessed area is disposed on the top surface, thereby defining a recessed surface disposed below said top surface and wherein said recessed surface defines the aperture through which said at least one connector element extends, and a bottom housing member having a plurality of support posts, configured to support said housing top.

11. An upgrade circuitry option module for a basic telephone having a base with an outer surface, a plurality of option bays on the base, each option bay having a connector slot within it, at least one option connector accessible through the connector slot, and a rear surface comprising a portion of the outer surface, the option module comprising:

a housing body having a bottom surface and a top surface and for configured to fit within and conform to the option bay of the basic telephone such that said bottom surface of said housing body can be positioned substantially flush with the outer surface of the base of the basic telephone, said top surface having a recessed area formed therein and an aperture formed within said recessed area;

an endcap connected to said housing body and configured to be flush with the rear surface of the basic telephone when the option module is installed within the option bay;

a printed wiring assembly enclosed in said housing body and having at least one degree of translational freedom of motion therein that enables said printed wiring assembly to move with respect to said housing body; and, a connector connected to said printed wiring assembly and extending through said aperture, wherein when the option module is installed in the option bay of the basic telephone, the printed circuit board and connector will shift in position and align with a mating connector in the basic telephone such that an electrical connection will be formed between said printed wiring assembly and the basic telephone.

12. An upgrade circuitry option module for a basic telephone having a base with an outer surface, a plurality of option bays on the base, each option bay having a connector slot within it, at least one option connector accessible through the connector slot, and a rear surface comprising a portion of the outer surface, the option module comprising:

a housing body having a bottom surface and a top surface and for configured to fit within and conform to the option bay of the basic telephone such that said bottom surface of said housing body can be positioned substantially flush with the outer surface of the base of the basic telephone, said top surface having a recessed area formed therein and an aperture formed within said recessed area;

an endcap connected to said housing body and configured to be flush with the rear surface of the basic telephone when the option module is installed within the option bay;

a printed wiring assembly disposed in said housing body wherein said printed wiring assembly is smaller than said housing body and is free to move across a predetermined range within said housing body; and, a connector connected to said printed wiring assembly and extending through said aperture.

* * * * *